United States Patent [19]
Helmcke et al.

[11] 3,809,803
[45] May 7, 1974

[54] CONDUCTOR FOR CONDUCTING ELECTRIC SIGNALS

[75] Inventors: Conrad Helmcke, Munchen; Walter Hermann, Weissenfeld; Peter Kraus, Munich, all of Germany

[73] Assignee: Messerschmitt-Bolkow-Blohm GmbH, Munich, Germany

[22] Filed: Aug. 3, 1972

[21] Appl. No.: 277,781

[52] U.S. Cl. ......... 174/114 R, 174/115, 174/117 F, 174/117 FF, 338/214
[51] Int. Cl. ............................................. H01b 7/08
[58] Field of Search ...... 174/114 R, 106 SC, 106 D, 174/117 F, 117 FF, 126 CP, 113 R, 115; 324/58.5 R; 338/210, 211, 212, 214

[56] References Cited
UNITED STATES PATENTS

| 3,265,865 | 8/1966 | Hager | 338/212 X |
| 689,615 | 12/1901 | Heyl-Dia | 174/126 CP |
| 759,119 | 5/1904 | McGeorge | 174/126 CP |
| 3,229,030 | 1/1966 | Baermann | 174/117 F |
| 3,459,880 | 8/1969 | Erdle | 174/117 FF |

FOREIGN PATENTS OR APPLICATIONS

| 655,840 | 1/1938 | Germany | 174/113 R |

*Primary Examiner*—E. A. Goldberg
*Attorney, Agent, or Firm*—Woodhams, Blanchard & Flynn

[57] ABSTRACT

Electrically conductive line particularly adapted for effecting measurement of linear distances. A plurality of parallel spaced electrical conductors are provided with means providing conductivity between said conductors throughout the full length thereof which conductivity is, however, of substantially less value than the conductivity of any one of the conductors. Due to the impedance of the conductors, this cross leakage attenuates the signal along the line and hence produces a measurable signal drop in a relatively short distance. This makes possible an accurate and progressive linear measurement.

9 Claims, 4 Drawing Figures

PATENTED MAY 7 1974

3,809,803

CONDUCTOR FOR CONDUCTING ELECTRIC SIGNALS

FIELD OF THE INVENTION

The invention relates to electrical conductors and particularly to such a conductor by which measurements of distance from one point to another along said conductor may be accurately and conveniently carried out.

BACKGROUND OF THE INVENTION

From certain mechanical applications, such as in tool machines or the like, a variety of means have been developed for the accurate positioning of movable machine parts. For example, this has been accomplished by means of a so-called meander conductor which is scanned by an inductive receiver to produce impulses corresponding to the number of measurement units scanned. The number of such pulses are then, if desirable, stored in a counter and utilized to measure the distance from a point of beginning. However, in such a measuring system movements of the machine part being measured which are smaller than one measurement unit are normally not discernible by the apparatus. Further, miscounts may occur in consequence of possible interference impulses and in such case a one-time occurring mistake may render incorrect all of the measurements thereafter following. Thus, in such apparatus further means are required in order to create a reference point whereby the zero point of one measurement is determined in order to effect control over subsequent possible mistakes.

The purpose of the invention is to produce an electrical conductor by means of which very precise distance measurements can be carried out and wherein the above-outlined difficulties will be eliminated.

Commencing with a conductor device comprising at least two parallel conductors which are positioned in spaced relationship with respect to each other and adapted for the conducting of electrical signals, the present invention proposes connecting the conductors over their entire length by conductive means which are of substantially less conductivity than the conductors. For example, for effecting such connection it is possible to utilize between said conductors a plastic foil having carbon coating.

This provides a cross leakage between the conductors and this results together with the longitudinal impedance of the conductors in a substantial attenuation of the signals passing along said line. It is, of course, recognized that the longitudinal impedance will include consideration of both the longitudinal inductance of the line and also, where the conductors are made of resistive material, their longitudinal resistance.

In such a system, the amplitude of the signal fed into the line by a suitable transmitting device decreases measurably along the length thereof, such decreasing being in an exponential relationship with a negative exponent. Thus, the amplitude of the signal at any given point can be used for measuring the distance between the transmitting device and such given point.

Thus the line as described is suitable for carrying out linear measurement between a transmitting device which emits a signal of predetermined amplitude and the receiving device of predetermined sensitivity.

Since a counting of distance units is not used in the system herein being considered, measurements with the line herein proposed can be used for determining the distance between two successive track supported objects independent of reference points on the track itself as further set forth in co-pending application Ser. No. 277,783, filed on Aug. 3, 1972 assigned to the same assignee as the present application.)

The invention in its basic form and in further developments thereof is set forth in detail hereinafter in connection with illustrative embodiments, same being schematically illustrated in the accompanying drawing, in which.

Figure 1:
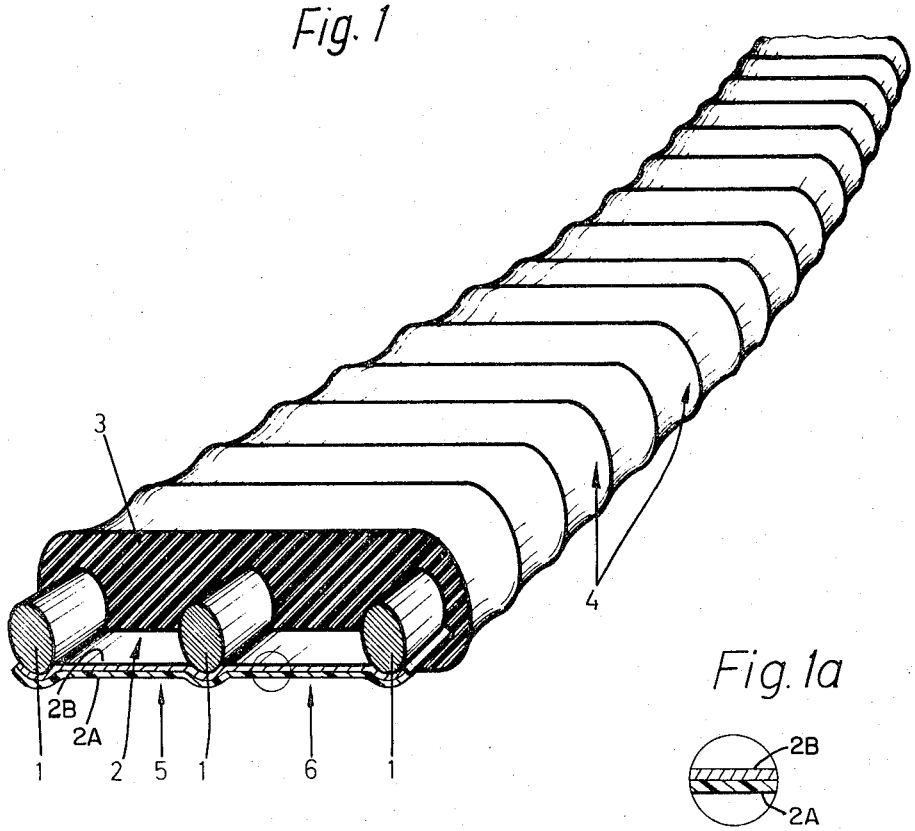
FIG. 1 illustrates an electrical signal transmission arrangement embodying the invention.
Figure 1A:
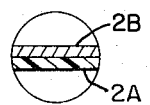
FIG. 1a is a cross section view of the connector in FIG. 1.

Referring first to FIG. 1 the three conductors 1 are positioned in a single plane and the two outer conductors are spaced equally from the central conductor. A symmetrical line of this nature has, as compared to a more common line with two parallel conductors, substantially greater freedom from interfacing magnetic fields. The conductors 1 are connected together by a very thin foil 2 which provides conductive means between said conductors throughout their entire length. Said conductors and coil are then embedded in suitable support means 3 of relatively non-conductive material, for example, a plastic material. The conductivity of the foil 2 is substantially less than the conductivity of any one of the conductors 1. For example, said foil 2 may be a plastic foil 2A having a thin carbon coating 2B. Thus, as already mentioned, there is obtained by use of the conducting foil 2 an ohmic cross leakage between said conductors. This cross leakage taken in connection with the longitudinal impedance of the conductors results in a high value of attenuation of signals along the line. Thus the amplitude of the signal fed into this line is diminished measurably in only a single centimeter of line length and is so diminished in a predictable and measurable manner. The amplitude of the signal at the point of receiving same thus may be utilized as a measurement of the distance of the receiving device from the signal producing transmitting device. These transmitting and receiving devices (not illustrated) can be coupled at any desired point to the line and further it is not important whether for example the receiving device for effecting measurement is movable longitudinally along the line or whether, either additionally or alternatively, the transmitting device along with a further object whose position is to be measured is moving longitudinally of the line. Thus it is possible to measure by the line of the invention in connection with both the transmitting and receiving devices movement of an object relative to a fixed point, in which case one of such devices will be stationary, and it is also possible to measure distances between two successive and moving objects. The latter can for example be used for track supported vehicles in various traffic and transport systems.

It is understood that the transmitting device will send out a signal of predetermined amplitude and the receiving device must accordingly have a predetermined sensitivity. The coupling of these devices (for example, a transistor generator or amplifier) with the line can be accomplished either inductively or galvanically.

As also appears in FIG. 1 the support 3 has a transversely extending ripple 4 which facilitates arranging said line in a curve.

Figure 2:
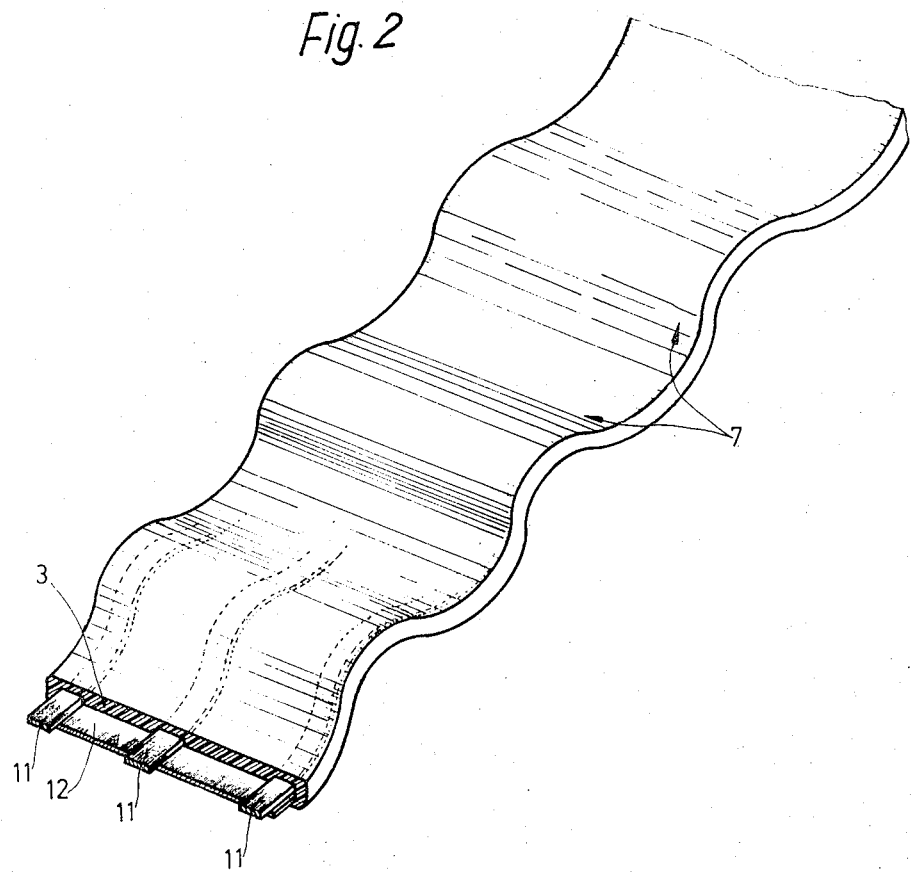
FIG. 2 illustrates an alternate embodiment.

Referring now to FIG. 2 there is illustrated a line utilizing three parallel conductors 11 arranged in a single plane, said conductors having rectangular cross sections (namely, so-called flat conductors) of which the two outer conductors are equidistant from the central conductor. The conductors 11 are connected together by a foil 12 of low conductivity which connects them conductively over their entire lengths and both conductors and the foil are embedded in a support 3 of a relatively non-conductive material, for example, a plastic material.

In order that this line may be curved it is provided with a transversely extending ripple 7 which ripple is provided in both the support 3 and in the conductors 11 and in the foil 12. Thus, during a bending of the conductors and foil in the plane of the line there is little likelihood of either stretching or linear compression of said conductors.

Figure 3:
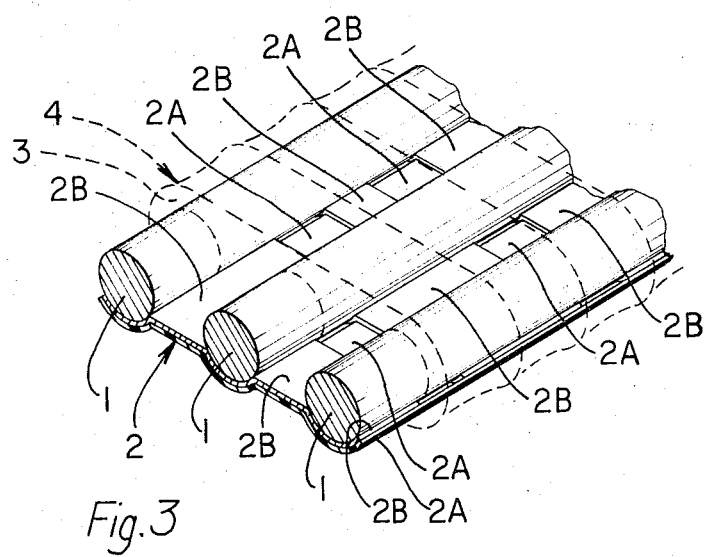
FIG. 3 illustrates an alternate embodiment of the foil with the support being shown in broken lines.

It is also possible to vary the conductivity of the foils 2 or 12 (FIG. 3) by variations in the current paths between the conductors 1 and 11, with respect to the length and/or cross section of said paths, for example, by means of the interruption in the conductive coating on the foil. In this manner, several connected lines can be adjusted in relation to one another with respect to the ohmic value of their cross leakages and also with respect to the two halves, 5 and 6, one line.

The embodiments of the invention in which an exclusive property or privilege is claimed are defined as follows:

1. An electrical signal transmission arrangement having at least two parallel conductors arranged spaced to one another for transporting of electric signals, comprising the improvement wherein said conductors are connected conductively to one another over their entire length such that the conductivity of this connection is substantially less than that of the conductors, said connection comprising a conducting foil made of a plastic having a carbon coating thereon.

2. An electrical signal transmission arrangement having three parallel conductors defining a plane, the outer two conductors being equally spaced from the central conductor, comprising the improvement wherein said conductors are connected conductively to one another over their entire length such that the conductivity of this connection is substantially less than that of the conductors, said connection comprising a conducting foil, said conductors together with said foil being embedded in a support made of a non-conductive material, which support has transversely extending ripples thereon.

3. An electrical signal transmission arrangement, comprising:
at least two laterally spaced and parallel electrical signal transmitting conductors; and
means defining a continuous very thin electrically conductive foil for electrically connecting said conductors continuously along the length of said conductors said foil means having a strength characteristic insufficient to support said conductors, the electrical conductivity of said foil means being less by a predetermined amount than the electrical conductivity of said conductors whereby the cross leakage of said electrical signal between said conductors will effect a higher than normal continuous attenuation of said electrical signal in a longitudinal direction along said conductors so that the amplitude of said electrical signal transmitted over said conductors will be continuously diminished in said longitudinal direction.

4. An electrical signal transmission arrangement, comprising:
at least two laterally spaced and parallel electrical signal transmitting conductors;
means defining a continuous very thin electrically conductive foil consisting of a plastic strip having an electrically conducting coating thereon for electrically connecting said conductors continuously along the length of said conductors, the electrical conductivity of said foil being less by a predetermined amount than the electrical conductivity of said conductors whereby the cross leakage of said electrical signal between said conductors will effect a higher than normal continuous attenuation of said electrical signal in a longitudinal direction along said conductors so that the amplitude of said electrical signal transmitted over said conductors will be continuously diminished in said longitudinal direction.

5. An electrical signal transmission arrangement according to claim 4, wherein said coating is a carbon coating.

6. An electrical signal transmission arrangement according to claim 4, wherein said electrically conductive coating is interrupted periodically along the length of said arrangement at selected locations.

7. An electrical signal transmission arrangement, comprising:
at least three laterally spaced and parallel electrical signal transmitting conductors defining a plane, the centrally positioned conductor being equidistant from each of the remaining conductors; and
electrical connection means for electrically connecting said conductors continuously along the length of said conductors, the electrical conductivity of said electrical connection means being less by a predetermined amount than the electrical conductivity of said conductors whereby the cross leakage of said electrical signal between said conductors will effect a higher than normal continuous attenuation of said electrical signal in a longitudinal direction along said conductors so that the amplitude of said electrical signal transmitted over said conductors will be continuously diminished in said longitudinal direction.

8. An electrical signal transmission arrangement, comprising:
at least two electrically spaced and parallel electrical signal transmitting conductors;
electrical connection means for electrically connecting said conductors continuously along the length of said conductors, the electrical conductivity of said electrical connection means being less by a predetermined amount than the electrical conductivity of said conductors whereby the cross leakage of said electrical signal between said conductors will effect a higher than normal continuous attenuation of said electrical signal in a longitudinal direction along said conductors so that the amplitude of said electrical signal transmitted over said conductors will be continuously diminished in said longitudinal direction; and means defining a nonconductive support encasing said conductors and said electrical connection means.

9. An electrical signal transmission arrangement according to claim 8, wherein said support means includes means defining a transversely extending ripple.

* * * * *